US008177403B2

(12) United States Patent
Yamamoto

(10) Patent No.: US 8,177,403 B2
(45) Date of Patent: May 15, 2012

(54) VEHICLE HEADLAMP

(75) Inventor: Teruaki Yamamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 409 days.

(21) Appl. No.: 12/393,248

(22) Filed: Feb. 26, 2009

(65) Prior Publication Data

US 2009/0213610 A1 Aug. 27, 2009

(30) Foreign Application Priority Data

Feb. 27, 2008 (JP) ................................ 2008-045761

(51) Int. Cl.
*B60Q 1/00* (2006.01)

(52) U.S. Cl. ....................................... 362/539; 362/538

(58) Field of Classification Search .................. 362/303, 362/305, 310, 321, 322, 351, 512, 507, 538, 362/539

See application file for complete search history.

(56) References Cited

U.S. PATENT DOCUMENTS

| | | | | |
|---|---|---|---|---|
| 6,857,768 | B2 * | 2/2005 | Watanabe et al. | 362/512 |
| 6,874,923 | B2 * | 4/2005 | Albou et al. | 362/512 |
| 7,267,465 | B2 * | 9/2007 | Mochizuki et al. | 362/539 |
| 7,455,439 | B2 * | 11/2008 | Albou et al. | 362/539 |
| 7,478,933 | B2 * | 1/2009 | Tajima et al. | 362/512 |

FOREIGN PATENT DOCUMENTS

| | | | |
|---|---|---|---|
| EP | 1213532 | A2 | 6/2002 |
| EP | 1764551 | A1 | 3/2007 |
| FR | 2787864 | A1 | 6/2000 |
| JP | 2006-073224 | A | 3/2006 |

OTHER PUBLICATIONS

Extended European Search Report dated May 19, 2009.

* cited by examiner

*Primary Examiner* — Hargobind S Sawhney

(74) *Attorney, Agent, or Firm* — Sughrue Mion, PLLC

(57) ABSTRACT

A vehicle headlamp is provided with a projection lens, a light source, a reflector, a first shade, and a second shade. The first shade includes an upper end crossing in a vicinity of a rear side focal point of the projection lens. The first shade shields a part of the light emitted from the light source and reflected by the reflector to form a first light distribution pattern. The second shade includes a light shielding portion for shielding a part of the light emitted from the light source and reflected by the reflector to form a second light distribution pattern. The second shade is movable between a first position and a second position. In the first position, the second shade is positioned above the first shade and is separated from the first shade so that the first light distribution pattern is formed. In the second position, the second shade covers the upper end of the first shade so that the second light distribution pattern is formed.

9 Claims, 7 Drawing Sheets

VEHICLE HEADLAMP

BACKGROUND OF THE INVENTION

1. Field of the Invention

The present invention relates to a vehicle headlamp and, more in detail, relates to a technical field for smoothing an operation of shades in the vehicle headlamp having two shades for switching a light distribution pattern.

2. Background Art

As a vehicle headlamp, for example, there is a type in which a lamp unit having a light source is disposed within a lamp outer casing configured by a cover and a lamp housing.

Some of such lamp units are configured to include a projection lens for projecting light emitted from the light source in the forward direction, a reflector for reflecting the light emitted from the light source to a side of the projection lens, and a light distribution pattern switching mechanism disposed between the projection lens and the light source. The light distribution pattern switching mechanism may have a function of switching between two light distribution patterns, that is, a light distribution pattern for a left hand traffic and a light distribution pattern for a right hand traffic.

As the distribution pattern switching mechanism, there is proposed a type which is configured to include two shades, that is, a first shade and a second shade each formed almost in a flat plate shape for shading a part of light emitted from the light source, wherein one of the first shade and the second shade is moved vertically with respect to the other in a state that the first and second shades are disposed along the front and rear direction of a vehicle (see JP-A-2006-073224).

According to the vehicle headlamp disclosed in JP-A-2006-073224, the second shade disposed on the rear side with respect to the first shade disposed on the front side is moved vertically, whereby the light distribution pattern is changed between the light distribution pattern for the left hand traffic and the light distribution pattern for the right hand traffic.

The first shade and the second shade are closely disposed in the front and rear direction of a vehicle in order to form a clear cut line of each of the light distribution patterns.

However, according to the vehicle headlamp disclosed in JP-A-2006-073224, since the first shade and the second shade are closely disposed in the front and rear direction of a vehicle, when the second shade is moved vertically, the first shade and the second shade may rub with each other so that the smoothing operation of the light distribution pattern switching mechanism may be impeded.

In particular, it is desirable to dispose the first and second shades as close as possible in order to clarify the cut line. However, when it is intended to more clarify the cut line, the possibility of a rubbing between the first and second shades increases and so the smoothing operation of the light distribution pattern switching mechanism is more likely impeded.

SUMMARY OF THE INVENTION

One or more embodiments of the invention provide a vehicle headlamp in which an operation of shades is smooth.

In accordance with one or more embodiments of the invention, in a first aspect, a vehicle headlamp is provided with: a projection lens that projects light in a forward direction; a light source disposed on a rear side of a rear side focal point of the projection lens; a reflector that reflects the light emitted from the light source toward the projection lens; a first shade that includes an upper end crossing in a vicinity of the rear side focal point and shields a part of the light emitted from the light source and reflected by the reflector to form a first light distribution pattern; and a second shade that includes a light shielding portion for shielding a part of the light emitted from the light source and reflected by the reflector to form a second light distribution pattern. In the vehicle headlamp, the second shade is movable between a first position where the second shade is positioned above the first shade to be separated from the first shade and the first light distribution pattern is formed by the first shade, and a second position where the second shade covers the upper end of the first shade and the second light distribution pattern is formed.

In the vehicle headlamp, by moving the second shade above the first shade, the first or second light distribution pattern is formed.

Accordingly, a rubbing between the first shade and the second shade is prevented when the second shade moves, so that a smooth operation of the second shade can be secured.

According to a second aspect, the first shade may be formed in a curved shape in a manner that an amount of deviation of the first shade in the forward direction increases toward a side directions with reference to a portion of the first shade crossing the optical axis, and the light shielding portion of the second shade may be formed in a curved shape in a manner that one end portion of the light shielding portion locates in a vicinity of the rear side focal point and an amount of deviation of the light shielding portion in the forward direction increases toward the other end portion, when the second shade positions in the second position. Thus, the cut off line of the second light distribution pattern formed when the second shade positioned in the second position can be formed clearly.

In a third aspect, the light shielding portion of the second shade may include a flat plane portion opposed to the upper end of the first shade when the second shade positions in the second position. Thus, the rigidity of the second shade can be enhanced.

In a fourth aspect, the light shielding portion of the second shade may include a front side shielding portion that protrudes downward from a front edge of the flat plane portion and that covers the upper end of the first shade from the front side when the second shade positions in the second position. Thus, since a light passing through a slit between the flat plane portion and the upper end of the first shade is shielded, the occurrence of a glare light can be prevented.

In a fifth aspect, the upper end of the first shade may include a cut line forming portion that forms a cut line of the light distribution pattern, the cut line forming portion may include a first portion that forms a horizontal cut line on an opposite lane side and a second portion that forms a horizontal cut line on an own lane side, the flat plane portion of the second shade may be opposed to the first portion when the second shade positioned in the second position, and at least a part of the front side shielding portion of the second shade may extend to one end portion of the second portion on a side of the first portion. Thus, since a light passing through a slit between the upper end of the first shade and an opening edge of a relief notch is shielded, the occurrence of a glare light can be prevented.

Other aspects and advantages of the invention will be apparent from the following description, the drawings and the claims.

DETAILED DESCRIPTION OF THE EXEMPLARY EMBODIMENTS

Hereinafter, an exemplary embodiment of the invention is explained with reference to accompanying drawings.

Vehicle headlamps 1, 1 are attached to respective left and right end portions of a front end portion of a vehicle body.

Figure 1:
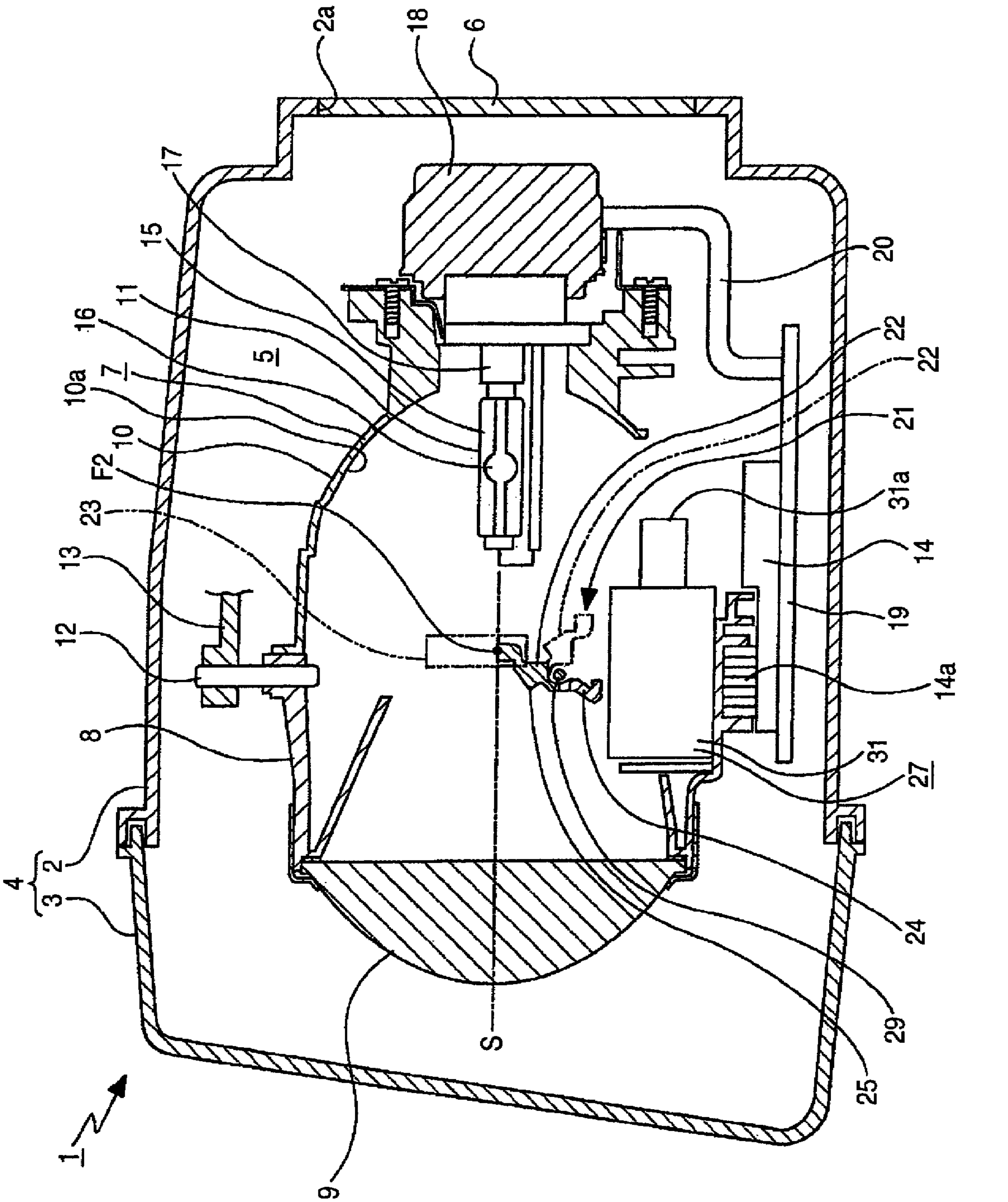
FIG. 1 is a schematic longitudinal sectional diagram showing a vehicle headlamp of an exemplary embodiment of the invention together with FIGS. 2 to 8.

As shown in FIG. 1, the vehicle headlamp 1 includes a lamp housing 2 having a concave portion opened in a forward direction and a cover 3 for closing an opened face of the lamp housing 2. A lamp outer casing 4 is formed by the lamp housing 2 and the cover 3. An inner space of the lamp outer casing 4 is formed as a lamp chamber 5.

An attachment hole 2*a* penetrating in a front and rear direction of a vehicle is formed at a rear end portion of the lamp housing 2. A back cover 6 is attached to the attachment hole 2*a*.

A lamp unit 7 is disposed in the lamp chamber 5. The lamp unit 7 includes a lens holder 8, a projection lens 9 attached to a front end portion of the lens holder 8, a reflector 10 attached to a rear face of the lens holder 8 and a light source 11 attached to a rear end portion of the reflector 10.

The lamp unit 7 is supported by the lamp housing 2 via a not-shown optical shaft adjustment mechanism. Thus, it is possible to move the lamp unit 7 in the elevational direction or the left and right direction with respect tot the lamp housing 2 to thereby adjust the optical axis of light emitted from the light source (aiming adjustment or leveling adjustment), by operating the optical shaft adjustment mechanism.

Figure 2:
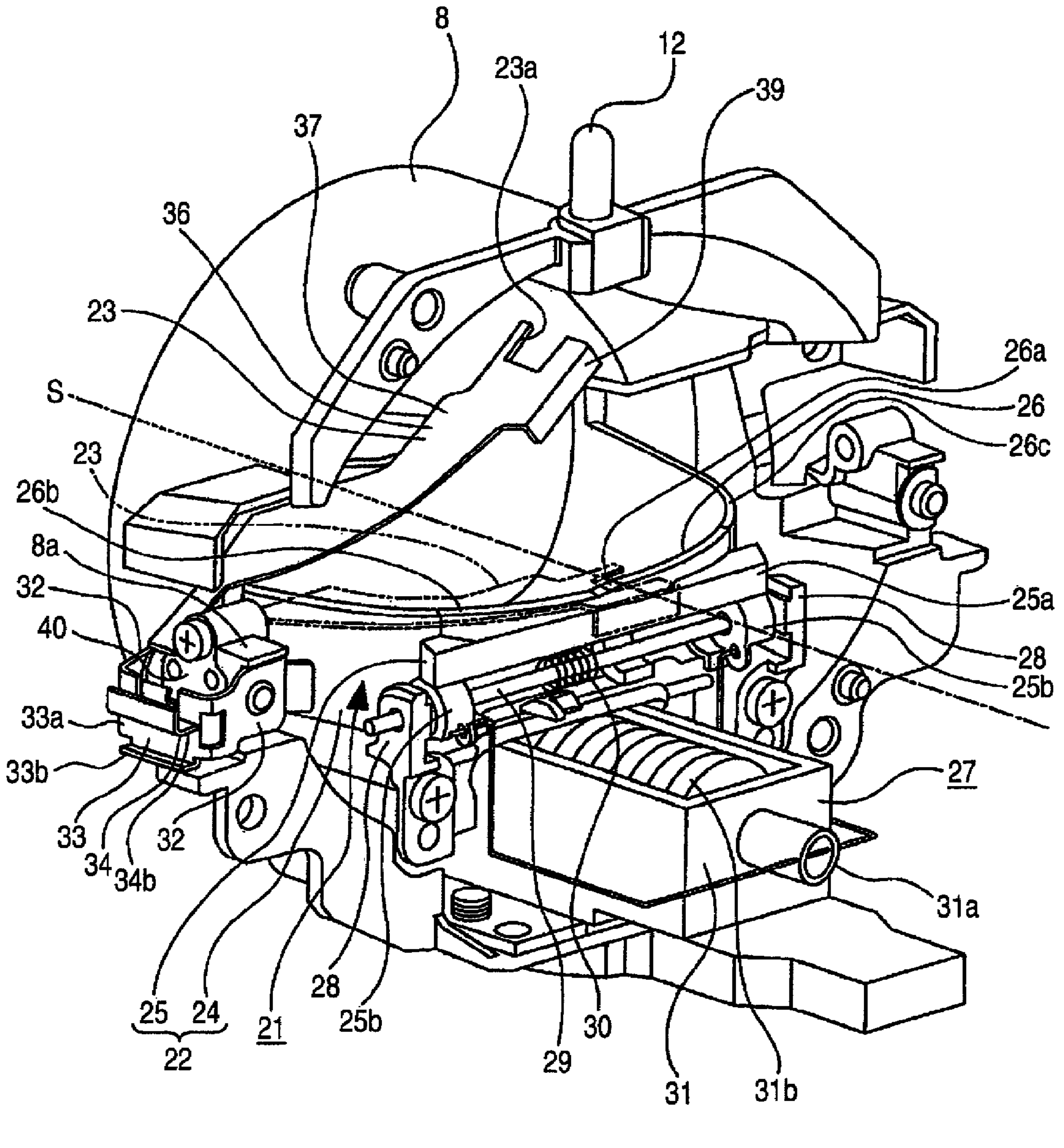
FIG. 2 is a perspective view showing a lens holder and a mechanism disposed therein.
Figure 3:
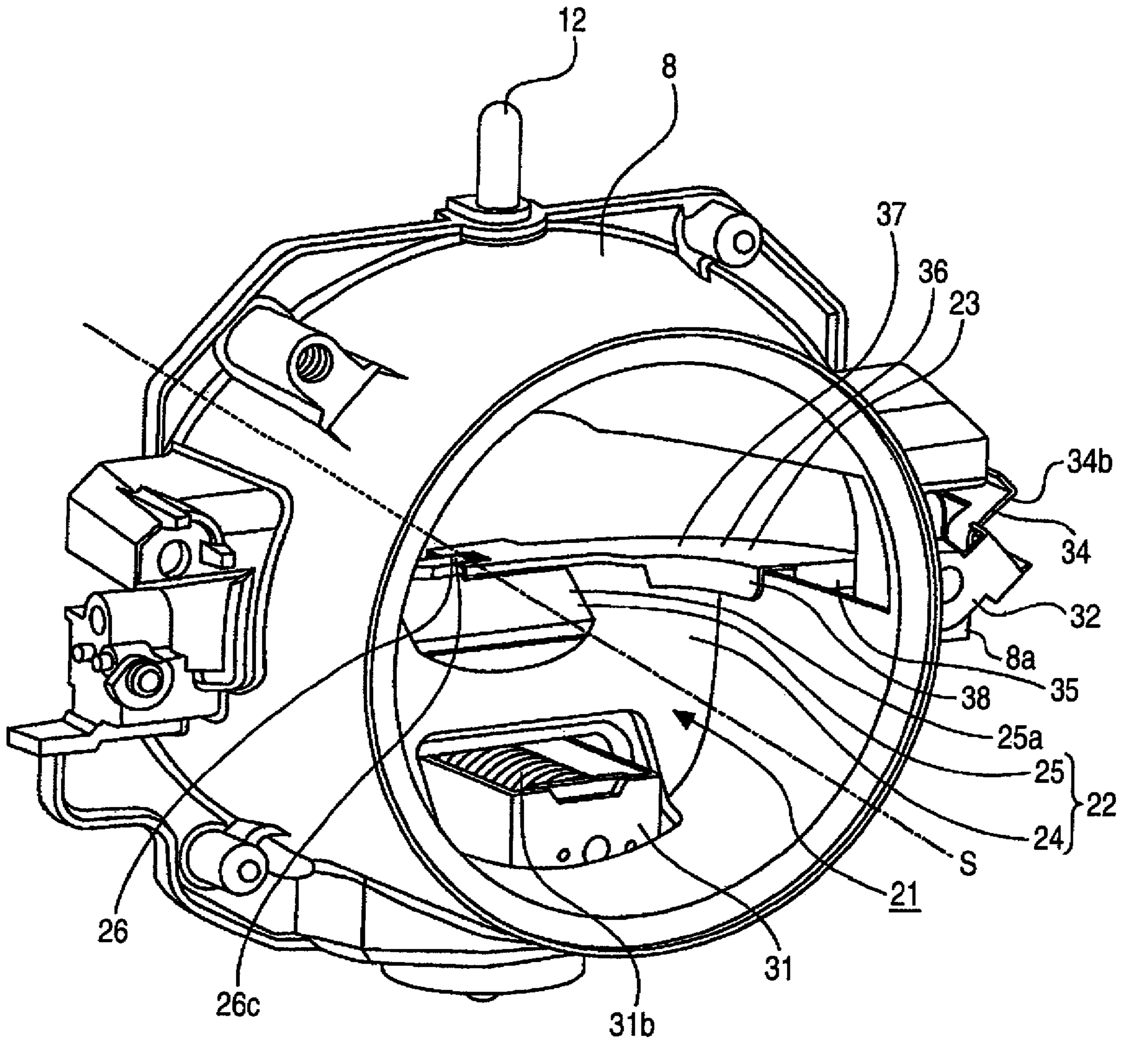
FIG. 3 is a perspective view showing the lens holder and the mechanism disposed therein which are seen from different direction from FIG. 2.

The lens holder 8 is formed in an almost cylindrical shape penetrated in the front and rear direction of the vehicle (see FIGS. 1 to 3). A rotary shaft 12 extending in the elevational direction is fixed to the upper end portion of the lens holder 8. The rotary shaft 12 is supported so as to be rotatable freely by a supporting member 13 located above the lens holder 8 within the lamp chamber 5 (see FIG. 1). Thus, the lamp unit 7 having the lens holder 8 is rotatable in the left and right direction with respect to the lamp outer casing 4 around the rotary shaft 12 acting as a fulcrum.

The rotary movement of the lamp unit 7 in the left and right direction with respect to the lamp outer casing 4 is carried out in association with the steering operation by a driver.

An actuator 14 is disposed beneath the lens holder 8 within the lamp chamber 5. The actuator 14 is provided at its front end portion with a coupling portion 14*a* protruding upward. The coupling portion 14*a* is coupled with the lower end portion of the lens holder 8. The coupling portion 14*a* rotates by the driving force of the actuator 14. When the coupling portion 14*a* rotates, the lamp unit 7 rotates in the left or right direction around the rotary shaft 12 acting as the fulcrum in accordance with the rotation direction of the coupling portion.

The projection lens 9 is configured in a manner that the surface on the front side has a convex surface and the surface on the rear side has a flat surface directed backward. The projection lens 9 has a function of reversing an image on a focal plane having a rear side focal point F2 and projecting the reversed image in the forward direction.

The inner surface of the reflector 10 is formed as a reflection face 10*a*. The reflection face 10*a* is formed in an almost ellipsoid, for example, except for the front end portion thereof. The reflection face 10*a* is formed in a manner that the first focal point coincides with the light emitting portion of the light source 11 described later and the second focal point coincides with the rear side focal point F2 of the projection lens 9, The light source 11 is a discharge lamp, for example, and emits light from a light emitting portion 16 provided within an outer tube 15. The outer tube 15 is held by a lamp base portion 17 disposed on the rear side thereof. The lamp base portion 17 is coupled to a bulb socket 18 disposed on the rear side of thereof.

A lighting circuit unit 19 is disposed at the lower end portion of the lamp chamber 5. The lighting circuit unit 19 located on the lower side of ht actuator 14. The bulb socket 18 is coupled to the lighting circuit unit 19 via a feeding line 20. Thus, when the lighting circuit unit 19 is driven, a driving voltage is applied to the light source 11 via the feeding line 20 to emit light from the light emitting portion 16. The light emitted from the light emitting portion 16 propagates in the forward direction or is reflected by the reflection face 10*a* of the reflector 10, then is converged on the focal plane including the rear side focal point F2 of the projection lens 9 and projected in the forward direction as illumination light by the projection lens 9.

Within the lamp unit 7, a light distribution pattern switching mechanism 21 is disposed between the projection lens 9 and the light source 11. The light distribution pattern switching mechanism 21 has a first shade 22 and a second shade 23 (see FIGS. 2 to 4).

The first shade 22 is configured by a fixed portion 24 and a movable portion 25. The movable portion 25 is rotatable with respect to the fixed portion 24.

The fixed portion 24 is configured in an almost bowl shape in a manner that the inner face thereof opened in the upper direction and the front direction is formed in a curved shape. A notch portion 24*a* opened upward is formed at the upper end portion of the fixed portion 24 except for the left and right end portions thereof (see FIG. 4).

As shown in FIG. 2, the movable portion 25 has an opening/closing portion 25*a* extending in an almost left and right direction and portions 25*b*, 25*b* respectively protruded downward from the left and right end portions of the opening/closing portion 25*a*.

The movable portion 25 is rotated so that the opening/closing portion 25*a* opens and closes the notch portion 24*a* of the fixed portion 24 in a manner that it is rotated between a first rotational position (the position of the movable portion 25 shown by a steady line in FIG. 1) for closing the notch portion 24*a* and a second rotational position (the position of the movable portion 25 shown by a phantom line in FIG. 1) for opening the notch portion 24*a*. The first rotational position is defined as a position for forming a light distribution pattern for a so-called low beam for irradiating a short range by the fixed portion 24 and the movable portion 25. The second rotational position is defined as a position for forming a light distribution pattern for a so-called high beam for irradiating a long range by the fixed portion 24 and the movable portion 25. Thus, when the movable portion 25 is rotated to the first or second rotational position, the light distribution pattern is changed between the low beam and the high beam.

Figure 4:
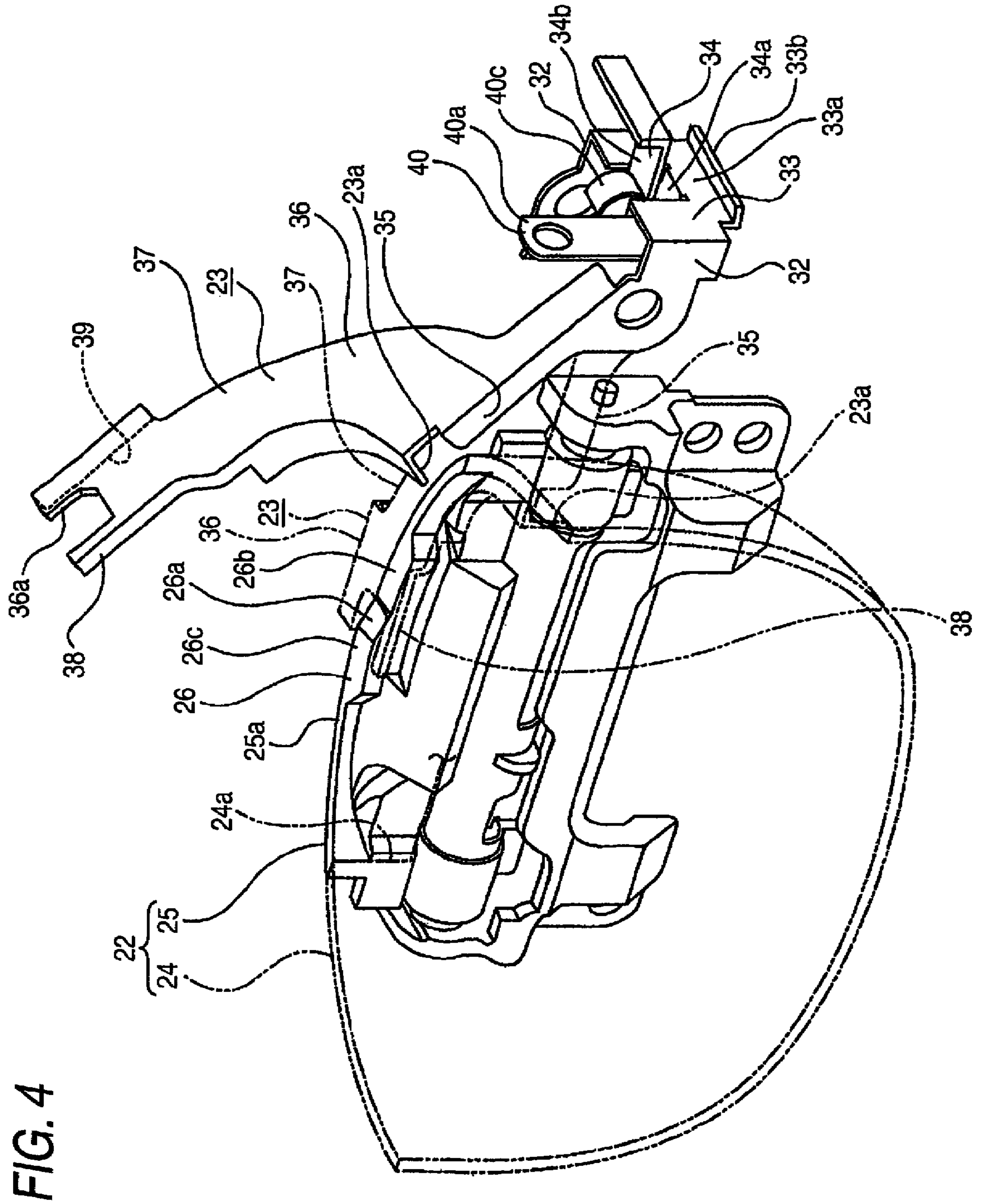
FIG. 4 is a perspective view showing a light distribution pattern switching mechanism.

The upper end surface of the first shade 22 is provided as a cut line forming portion 26 for forming a cut line in the light distribution pattern. The cut line forming portion 26 is configured in a manner, as shown in FIGS. 2 and 4, that the center portion thereof in the left and right direction, that is, the center portion in the left and right direction of the movable portion 25 is formed as a slanted portion 26*a*, and the left and right portions of the slanted portion 26*a* are formed as a first portion 26*b* and a second portion 26*c* extending in the horizontal direction, respectively. The first portion 26*b* locates at the position slightly lower than the second portion 26*c*, whereby the first portion 26*b* acts as a portion for forming a horizontal cut line on the opposite lane side and the second portion 26*c* acts as a portion for forming a horizontal cut line on the lane on the own vehicle side.

In the state where the movable portion 25 locates at the first rotational position, the slanted portion 26*a* of the cut line forming portion 26 almost crosses the optical axis S of the light emitted from the light source 11 (see FIG. 1).

The movable portion 25 is made rotatable by a rotary mechanism 27. The rotary mechanism 27 is disposed on the upper surface of the lower surface portion of the lens holder 8 (see FIGS. 1 and 2). As shown in FIG. 2, the rotary mechanism 27 has supporting projection portions 28, 28, a fulcrum shaft 29 elongated in the left and right direction, a bias spring 30 formed by a torsion spring, a solenoid block 31 and a coupling link 32 of a wire shape.

The supporting projection portions 28, 28 are disposed on the outer sides in the left and right direction of the supported projection portions 25*b*, 25*b* of the movable portion 25, respectively, and fixed to the lens holder 8.

The fulcrum shaft 29 penetrates the supporting projection portions 28, 28 and the supported projection portions 25*b*, 25*b* of the movable portion 25. The movable portion 25 is rotatable with respect to the supporting projection portions 28, 28 around the fulcrum shaft 29 acting as a fulcrum.

The spring 30 is supported by the fulcrum shaft 29 and has a function of biasing the movable portion 25 toward the first rotational position.

The solenoid block 31 is provided with a driving tube 31*a* which is protruded backward and movable in the front and rear direction of the vehicle. The driving tube 31*a* is coupled with the supported projection portions 25*b*, 25*b* of the movable portion 25 via a coupling link 32.

In the rotary mechanism 27, when the driving tube 31*a* is moved in the forward direction by the driving of the solenoid 31*b* of the solenoid block 31, the movable portion 25 rotates toward the second rotational position from the first rotational position around the fulcrum shaft 29 acting as the fulcrum. In contrast, when the driving tube 31*a* is moved in the backward direction by the driving of the solenoid 31*b* of the solenoid block 31, the movable portion 25 rotates toward the first rotational position from the second rotational position around the fulcrum shaft 29 acting as the fulcrum.

Figure 5:
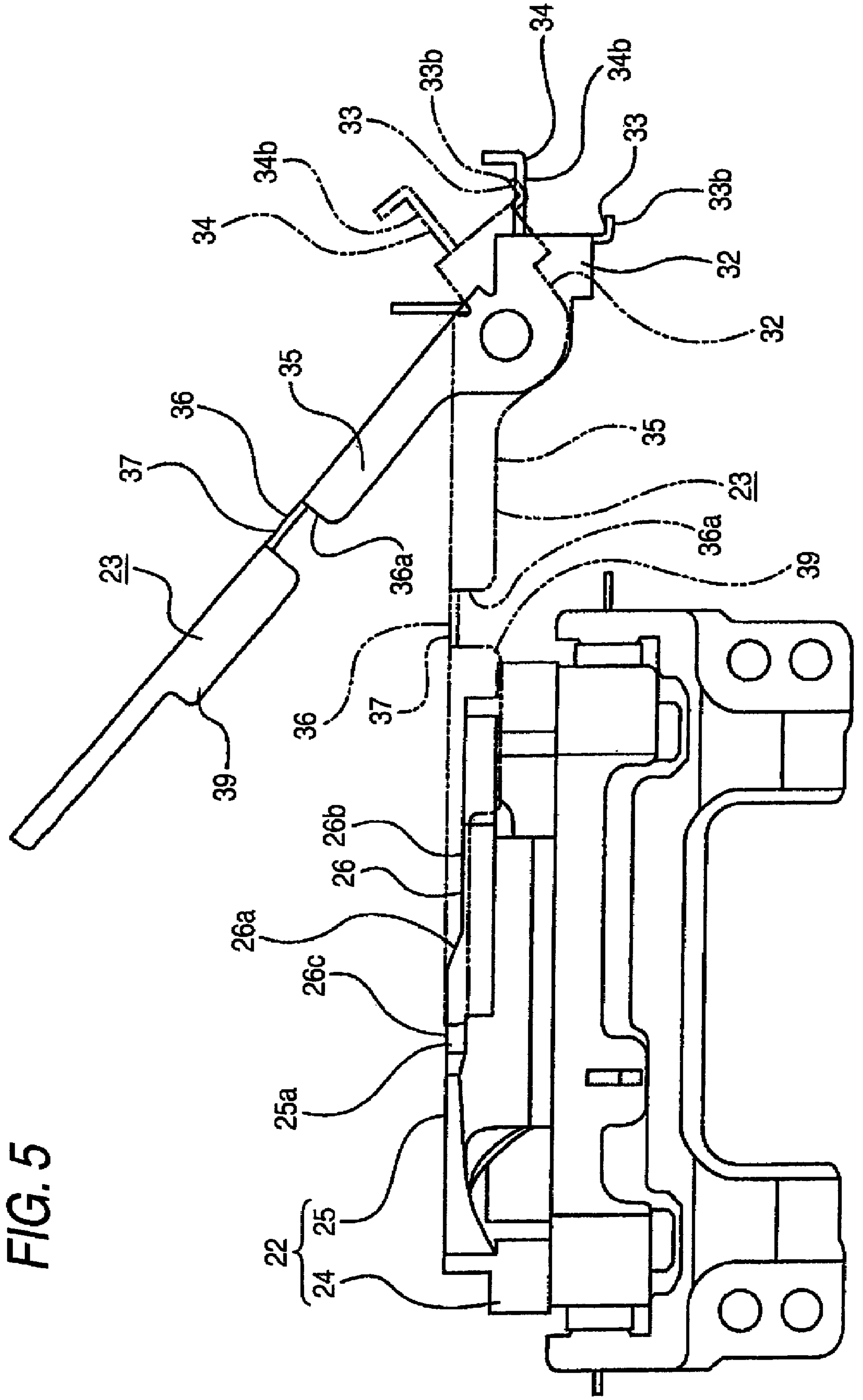
FIG. 5 is a front view showing the operation of a second shade.

A supporting portion 8*a* is provided at the one end portion in the left and right direction of the lens holder 8 (see FIG. 2). The second shade 23 is supported by the supporting portion 8*a* so as to be rotatable. The second shade 23 is formed by processing metal material of a plate shape in a predetermined shape. As shown in FIGS. 2, 4 and 5, the second shade 23 is configured by supported surface portions 32, 32 disposed in an opposite manner in the front and rear direction of the vehicle, a coupling surface portion 33 for coupling the respective one end of the supported surface portions 32, 32, a stopped surface portion 34 provided at the center portion in the front and rear direction of the coupling surface portion 33, a side projection portion 35 protruded aside from the supported surface portion 32 on the front side and directed to the front and rear direction, and a light shielding portion 36 protruded in an almost rear slanted side direction form the upper edge of the side projection portion 35.

In the second shade 23, the supported surface portions 32, 32 are supported by the front and rear surfaces of the supporting portion 8*a* of the lens holder 8 so as to be rotatable, respectively.

The coupling surface portion 33 is configured by a base portion 33*a* located between the supported surface portions 32, 32, and a stopper portion 33*b* bent outside from the lower edge of the base portion 33*a*.

Figure 6:
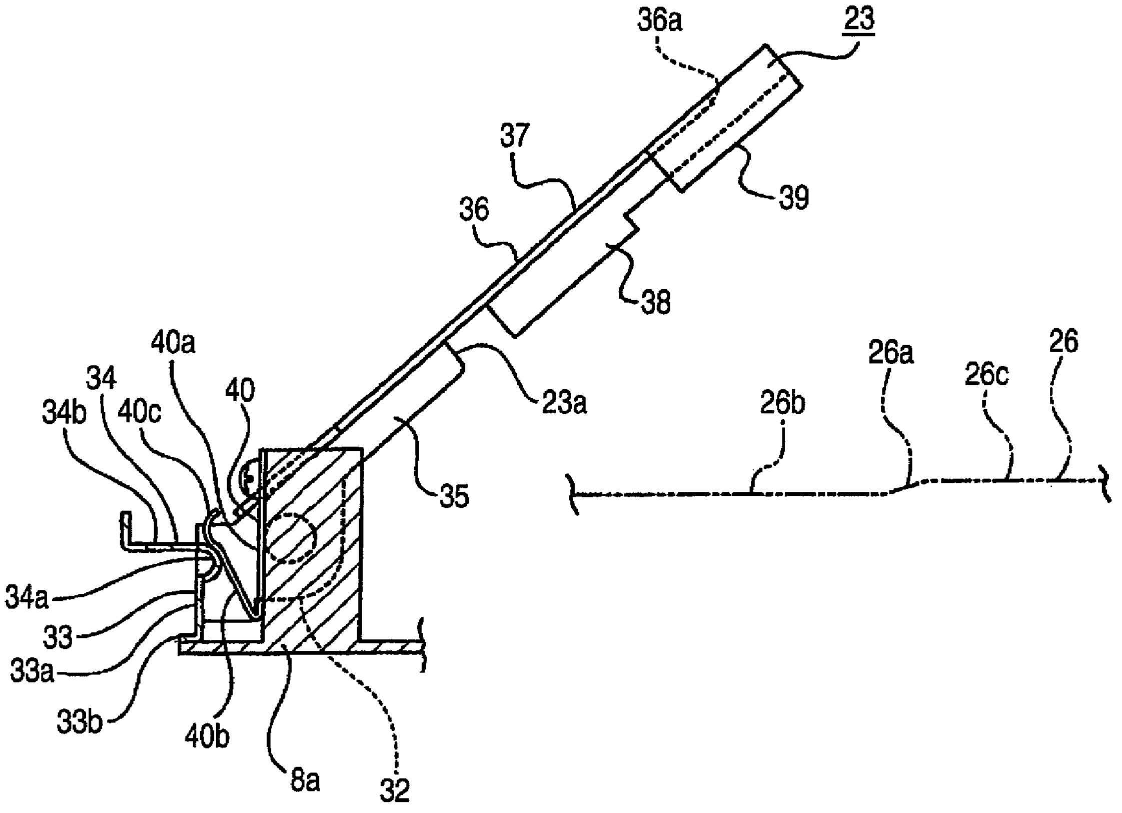
FIG. 6 is a conceptual diagram showing, together with FIG. 7, the operation of the second shade and a state of a leaf spring according to the operation of the second shade in the case where the second shade locates at the first position.

As shown in FIG. 6, the stopped surface portion 34 has a sliding portion 34*a* continuing to the upper edge of the base portion 33*a* of the coupling surface portion 33 and an extended portion 34*b* continuing to the sliding portion 34*a*. The sliding portion 34*a* is formed in a semi-cylindrical shape which shaft extends in the front and rear direction. The extended portion 34*b* is formed in a flat plate shape.

As shown in FIGS. 2 and 4, the light shielding portion 36 is formed in a gentle arc shape as a whole and is configured by a flat plane portion 37 continuing to the side projection portion 35, a front side shielding portion 38 formed by bending the front edge of the flat plane portion 37 downward, and a rear side shielding portion 39 formed by bending the rear edge of the tip end portion of the flat plane portion 37 downward.

The second shade 23 is provided with a disposing notch 23*a* between the front side shielding portion 38 and the side projection portion 35. The disposing notch 23*a* is opened downward and penetrated in the front and rear direction. A relief notch 36*a* is formed at the tip end portion of the flat plane portion 37 of the shielding portion 36. The relief notch 36*a* is opened to the side direction and penetrated in the vertical direction.

A leaf spring 40 is attached to the one side surface of the supporting portion 8*a* of the lens holder 8 (see FIGS. 2, 4 and 6). The leaf spring 40 is configured by an attached surface portion 40*a* extending elevationally, a spring portion 40*b* continuing to the lower edge of the attached surface portion 40*a* and bent upside with respect to the attached surface portion 40*a*, and a pressing portion 40*c* continuing to the upper edge of the spring portion 40*b*. The pressing portion 40*c* is formed in an almost semi-arc shape which axis extends in the front and rear direction. The pressing portion 40*c* and the sliding portion 34*a* of the stopped surface portion 34 of the second shade 23 are formed so as to oppose to each other in their protruding directions. The sliding portion 34*a* slides with respect to the pressing portion 40*c* in accordance with the rotating operation of the second shade 23.

Figure 7:
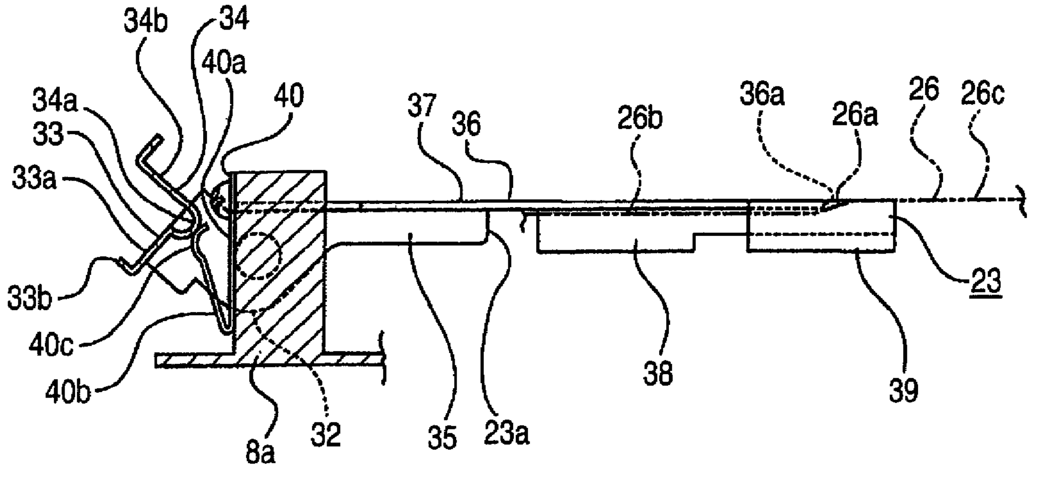
FIG. 7 is a conceptual diagram showing a state where the second shade locates at the first position.

The second shade 23 rotates between the first position separated upward from the first shade 22 and the second position covering a part of the cut line forming portion 26 of the first shade 22 from the upper side (see FIGS. 5 to 7). When the second shade 23 is rotated between the first position and the second position, a first light distribution pattern and a second light distribution pattern, for example, the light distribution pattern for a left hand traffic and the light distribution pattern for a right hand traffic are switched.

In the state where the second shade 23 locates at the first position, as shown in FIG. 6, the sliding portion 34*a* is made in contact with and pressed by the lower edge of the pressing portion 40*c* of the leaf spring 40. Thus, the second shade 23 is restricted in its rotation operation toward the second position from the first position by the biasing force of the leaf spring 40 and so held at the first position.

In the first position, the stopper portion 33*b* of the coupling surface portion 33 in the second shade 23 is made in contact with a part of the supporting portion 8*a* of the lens holder 8, whereby the second shade 23 is restricted in its rotation operation in the upward direction. In this case, as explained above, since the biasing force of the leaf spring 40 acts on the sliding portion 34*a* of the second shade 23, the stopper portion 33*b* is pressed against the part of the supporting portion 8*a*, whereby the second shade 23 can be held surely in the state of being positioned at the first position.

In the state where the second shade 23 locates at the first position, the first light distribution pattern is former by the first shade 22. In this case, if the light emitted from the light source 11 is reflected to an unnecessary direction or shielded by the second shade 23, the formation of the first light distribution pattern may be influenced. In order to suppress the occurrence of such a problem to the minimum degree, according to the vehicle headlamp 1, the second shade 23 is formed in a curved shape as a whole so as to suppress the phenomenon that the light emitted from the light source 11 is reflected to the unnecessary direction or shielded by the second shade 23.

When the second shade 23 is rotated toward the second position from the first position, as described above, the sliding portion 34*a* of the second shade 23 is slid with respect to the pressing portion 40*c* of the leaf spring 40 to thereby elastically deform the leaf spring 40.

A part of the second shade 23 is made in contact with a not-shown positioning concave portion formed at the first shade 22, whereby the second shade is positioned at the second position.

In the state where the second shade 23 locates at the second position, as shown in FIG. 7, the sliding portion 34*a* of the second shade 23 is made in contact with and pressed by the upper edge of the pressing portion 40*c* of the leaf spring 40. Thus, the second shade 23 is restricted in its rotation operation toward the first position from the second position by the biasing force of the leaf spring 40 and so held at the second position. In this case, as described above, since the biasing force of the leaf spring 40 acts on the sliding portion 34*a* of the second shade 23, the part of the second shade 23 is pressed against the positioning concave portion, whereby the second shade 23 is held surely in a state of being positioned at the second position.

In the second position, the flat plane portion 37 of the shielding portion 36 of the second shade 23 covers the first portion 26*b* of the cut line forming portion 26 of the first shade 22 from the upper side, whereby the flat plane portion 37 is disposed close to or abuts against the first portion 26*b* (see FIG. 7). In this case, the slanted portion 26*a* of the cut line forming portion 26 is inserted and positioned in the relief notch 36*a* formed at the shielding portion 36 of the second shade 23 (see FIGS. 2 and 4). The disposing notch 23*a* of the second shade 23 is located so that the upper end portion of the first portion 26*b* of the cut line forming portion 26 is inserted therein.

Figure 8:
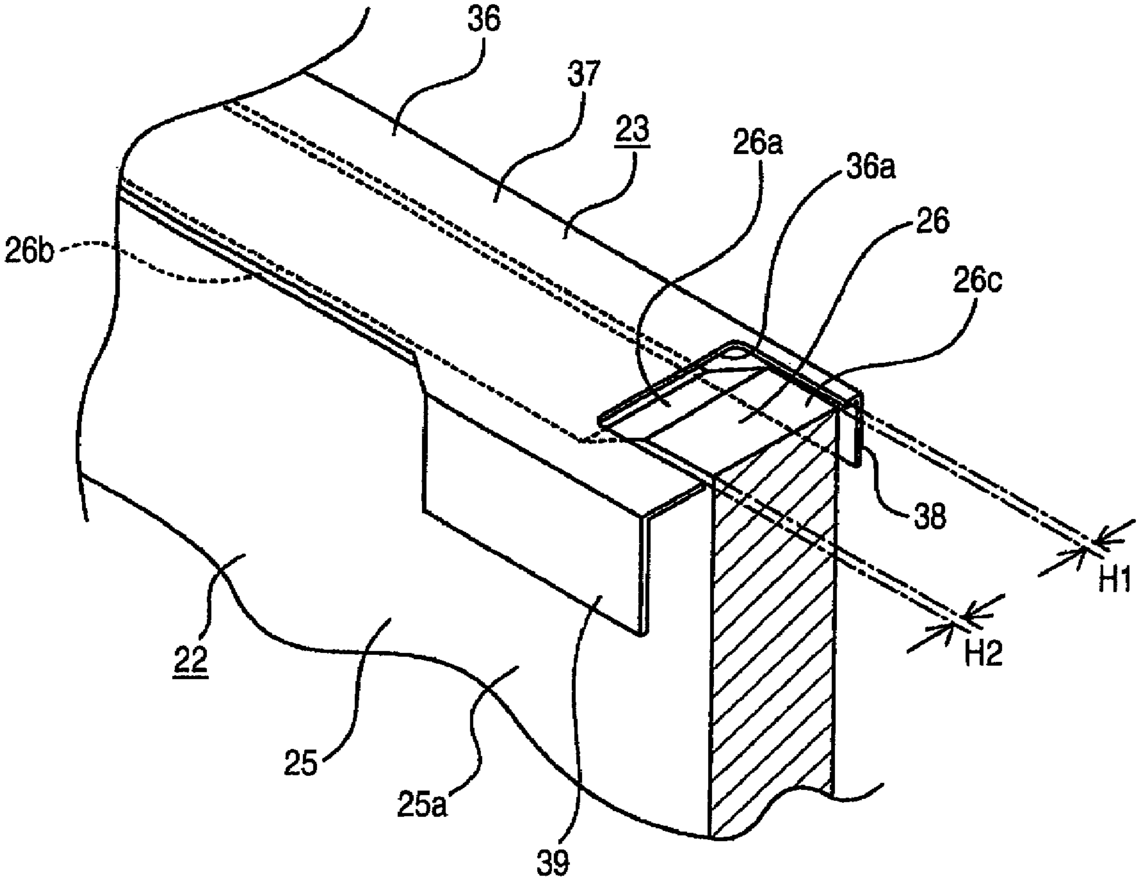
FIG. 8 is an enlarged perspective view showing a positional relation between the first shade and the second shade.

In the state where the second shade 23 locates at the second position, as shown in FIG. 8, the front side shielding portion 38 and the rear side shielding portion 39 are positioned so as to sandwich a part of the upper end portion of the first shade 22 therebetween from the front and rear directions, and each of the tip end portions of the front side shielding portion 38 and the rear side shielding portion 39 locates on the second portion 26*c* side than the slanted portion 26*a* side of the cut line forming portion 26. In this case, since the light shielding portion 36 is formed in the gentle arc shape as a whole, the light shielding portion is located so as to be along the first portion 26*b* of the cut line forming portion 26 of the first shade 22. The one end portion of the light shielding portion 36 is located near the rear side focal point F2.

In the state where the second shade 23 locates at the second position, as described above, the flat plane portion 37 of the shielding portion 36 is disposed close to or abuts against the first portion 26*b* of the cut line forming portion 26 of the first shade 22. Thus, as lit extending in the horizontal direction may be formed between the flat plane portion 37 and the first portion 26*b*, so that a light emitted from the light source 11 may pass the slit and be irradiated in the forward direction as a glare light.

Thus, the second shade 23 is provided with the front side shielding portion 38 which shields a part of the upper end portion of the first shade 22 from the front side at the second position, whereby a light passing through the slit between the flat plane portion 37 and the first portion 26*b* is shielded to thereby prevent the occurrence of the glare light.

Further, in the state where the second shade 23 locates at the second position, as described above, the slanted portion 26*a* of the cut line forming portion 26 locates at the relief notch 36*a* formed at the shielding portion 36. Thus, as shown in FIG. 8, slits H1, H2 are formed between the upper end of the first shade 22 and the both edges of the relief notch 36*a* on the front and rear sides, respectively. Thus, a light emitted from the light source 11 may pass these slits and be irradiated in the forward direction as a glare light.

Thus, the second shade 23 is provided with the front side shielding portion 38 and the rear side shielding portion 39 which shield the part of the upper end portion of the first shade 22 from the front and rear sides at the second position, whereby a light passing through the slits H1, H2 between the upper end of the first shade 22 and the both edges of the relief notch 36*a* on the front and rear sides is shielded to thereby prevent the occurrence of the glare light.

In the second shade 23, when a distance between the front side shielding portion 38 and the front face of the upper end portion of the first shade 22 is made large, the cut line of the second light distribution pattern may become dim. Thus, in the vehicle headlamp 1, the front side shielding portion 38 is disposed near the front face of the upper end portion of the first shade 22 so as to reduce the distance between the front side shielding portion 38 and the front face of the upper end portion of the first shade 22.

Further, even in the state where the second shade 23 locates at the second position, there may arise a case that the movable portion 25 of the first shade 22 is rotated with respect to the fixed portion 24. Thus, in the vehicle headlamp 1, the position of the rear side shielding portion 39 is set so that a distance between the rear side shielding portion 39 and the rear face of the upper end portion of the first shade 22 is secured to be a predetermined value or more, thereby preventing the interference between the rear side shielding portion 39 and the movable portion 25 at the time of rotating the movable portion 25.

As described above, according to the vehicle headlamp 1, since the second shade 23 moves above the first shade 22 between the first position separated above from the first shade 22 and the second position covering the part of the cut line forming portion 26 of the first shade 22 from the upper side, the second shade 23 is prevented from rubbing with the first shade 22 when the second shade 23 moves. Thus, the smooth operation of the light distribution pattern switching mechanism 21 can be secured.

Further, since the second shade 23 is prevented from rubbing with the first shade 22 when the second shade 23 moves, the generation of dust due to the rubbing between the first shade 22 and the second shade 23 can be prevented.

Further, the first shade 22 is formed in a curved shape in a manner that an amount of the deviation of the first shade in the forward direction becomes larger toward the side directions with reference to the portion crossing the optical axis S, that is, the slanted portion 26*a* of the cut line forming portion 26. The light shielding portion 36 of the second shade 23 is formed in a curved shape in a manner that the one end portion thereof locates near the rear side focal point F2 at the second position and an amount of the deviation of the light shielding portion in the forward direction becomes larger toward the other end portion. Thus, the cut off line of the second light distribution pattern formed when the second shade 23 locates at the second position can be formed clearly. In particular, when the light shielding portion 36 of the second shade 23 is formed in a curved shape along the meridional image surface, the cut off line can be formed more clearly.

As described above, in the vehicle headlamp 1, each of the first shade 22 and the second shade 23 is formed in the curved shape in a manner that an amount of the deviation of the shade in the forward direction becomes larger toward the side direction. However, since these shades are not slid therebetween, even in the case of forming the first shade 22 and the second shade 23 in such the shapes, the smooth moving operation of the second shade 23 can not be interfered.

Further, since the second shade 23 has the flat plane portion 37 formed so as to have the predetermined width in the front and rear direction, the rigidity of the second shade 23 can be enhanced.

Furthermore, since the second shade 23 has the front side shielding portion 38 and the rear side shielding portion 39 each formed by being bent downward with respect to the flat plane portion 37, the rigidity of the second shade 23 can be further enhanced.

The respective shapes and structures shown in the embodiment of the invention are mere examples for carrying out the invention and the technical scope of the invention is not limited thereto.

While description has been made in connection with specific exemplary embodiment of the invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS

1 vehicle headlamp
9 projection lens
10 reflector
11 light source
22 first shade
23 second shade
26 cut line forming portion
26*b* first portion
26*c* second portion
36 light shielding portion
37 flat plane portion
38 front side shielding portion

What is claimed is:

1. A vehicle headlamp comprising:

a projection lens that projects light in a forward direction;

a light source disposed on a rear side of a rear side focal point of the projection lens;

a reflector that reflects the light emitted from the light source toward the projection lens;

a first shade that includes an upper end crossing in a vicinity of the rear side focal point and shields a part of the light emitted from the light source and reflected by the reflector to form a first light distribution pattern; and a second shade that includes a light shielding portion for shielding a part of the light emitted from the light source and reflected by the reflector to form a second light distribution pattern, wherein the second shade is movable between a first position where the second shade is positioned above the first shade to be separated from the first shade and the first light distribution pattern is formed by the first shade, and a second position where the second shade covers the upper end of the first shade and the second light distribution pattern is formed, and wherein the second shade is rotatable around an axis extending in a front-rear direction of the headlamp.

2. The vehicle headlamp according to claim 1, wherein the light shielding portion of the second shade includes a flat plane portion opposed to the upper end of the first shade when the second shade positions in the second position.

3. The vehicle headlamp according to claim 2, wherein the light shielding portion of the second shade includes a front side shielding portion that protrudes downward from a front edge of the flat plane portion and that covers the upper end of the first shade from the front side when the second shade positions in the second position.

4. The vehicle headlamp according to claim 3, wherein the upper end of the first shade includes a cut line forming portion that forms a cut line of the light distribution pattern, the cut line forming portion includes a first portion that forms a horizontal cut line on an opposite lane side and a second portion that forms a horizontal cut line on an own lane side, the flat plane portion of the second shade is opposed to the first portion when the second shade positioned in the second position, and at least a part of the front side shielding portion of the second shade extends to one end portion of the second portion on a side of the first portion.

5. The vehicle headlamp according to claim 1, wherein the first shade is formed in a curved shape in a manner that an amount of deviation of the first shade in the forward direction increases toward a side directions with reference to a portion of the first shade crossing the optical axis, and the light shielding portion of the second shade is formed in a curved shape in a manner that one end portion of the light shielding portion locates in a vicinity of the rear side focal point and an amount of deviation of the light shielding portion in the forward direction increases toward the other end portion, when the second shade positions in the second position.

6. The vehicle headlamp according to claim 1, wherein the cut line of the second light distribution pattern is formed by the combination of the first shade and the second shade.

7. A vehicle headlamp comprising:

a projection lens that projects light in a forward direction;

a light source disposed on a rear side of a rear side focal point of the projection lens;

a reflector that reflects the light emitted from the light source toward the projection lens;

a first shade that includes an upper end crossing in a vicinity of the rear side focal point and shields a part of the light emitted from the light source and reflected by the reflector to form a first light distribution pattern; and a second shade that includes a light shielding portion for shielding a part of the light emitted from the light source and reflected by the reflector to form a second light distribution pattern, wherein the second shade is movable between a first position where the second shade is positioned above the first shade to be separated from the first shade and the first light distribution pattern is formed by the first shade, and a second position where the second shade covers the upper end of the first shade and the second light distribution pattern is formed, and wherein the first shade is formed in a curved shape in a manner that an amount of deviation of the first shade in the forward direction increases toward a side directions with reference to a portion of the first shade crossing an optical axis, and the light shielding portion of the second shade is formed in a curved shape in a manner that one end portion of the light shielding portion locates in a vicinity of the rear side focal point and an amount of deviation of the light shielding portion in the forward direction increases toward the other end portion, when the second shade positions in the second position.

8. A vehicle headlamp comprising:

a projection lens that projects light in a forward direction;

a light source disposed on a rear side of a rear side focal point of the projection lens;

a reflector that reflects the light emitted from the light source toward the projection lens;

a first shade that includes an upper end crossing in a vicinity of the rear side focal point and shields a part of the light emitted from the light source and reflected by the reflector to form a first light distribution pattern; and a second shade that includes a light shielding portion for shielding a part of the light emitted from the light source and reflected by the reflector to form a second light distribution pattern, wherein the second shade is movable between a first position where the second shade is positioned above the first shade to be separated from the first shade and the first light distribution pattern is formed by the first shade, and a second position where the second shade covers the upper end of the first shade and the second light distribution pattern is formed, wherein the light shielding portion of the second shade includes a flat plane portion opposed to the upper end of the first shade when the second shade positions in the second position, and wherein the light shielding portion of the second shade includes a front side shielding portion that protrudes downward from a front edge of the flat plane portion and that covers the upper end of the first shade from the front side when the second shade positions in the second position, wherein the second shade is rotatable around an axis extending in a front-rear direction of the headlamp.

9. The vehicle headlamp according to claim 8, wherein the upper end of the first shade includes a cut line forming portion that forms a cut line of the light distribution pattern, the cut line forming portion includes a first portion that forms a horizontal cut line on an opposite lane side and a second portion that forms a horizontal cut line on an own lane side, the flat plane portion of the second shade is opposed to the first portion when the second shade positioned in the second position, and at least a part of the front side shielding portion of the second shade extends to one end portion of the second portion on a side of the first portion.

* * * * *